(12) United States Patent
Kargilis et al.

(10) Patent No.: US 9,409,604 B2
(45) Date of Patent: Aug. 9, 2016

(54) PUSH PLUG WITH PASSIVE SEATING FEATURE AND INSTALLATION METHOD

(71) Applicants: John S Kargilis, Northville, MI (US); Roger E Schamanek, Sterling Heights, MI (US)

(72) Inventors: John S Kargilis, Northville, MI (US); Roger E Schamanek, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 89 days.

(21) Appl. No.: 14/559,961

(22) Filed: Dec. 4, 2014

(65) Prior Publication Data

US 2016/0159403 A1    Jun. 9, 2016

(51) Int. Cl.
 *B62D 25/00* (2006.01)
 *B62D 25/02* (2006.01)
 *B62D 65/02* (2006.01)

(52) U.S. Cl.
 CPC .............. *B62D 25/02* (2013.01); *B62D 65/024* (2013.01)

(58) Field of Classification Search
 CPC ............................. B62D 25/02; B62D 65/024
 USPC ...................................... 296/1.06, 191, 146.1
 See application file for complete search history.

(56) References Cited

U.S. PATENT DOCUMENTS

| 3,606,446 | A | | 9/1971 | Leslie | |
|---|---|---|---|---|---|
| 4,363,420 | A | | 12/1982 | Andrews | |
| 5,505,324 | A | * | 4/1996 | Danico | B62D 25/24 |
| | | | | | 220/201 |
| 5,558,346 | A | | 9/1996 | Hartery | |
| 5,709,309 | A | * | 1/1998 | Gallagher | B62D 25/24 |
| | | | | | 137/849 |
| 5,873,623 | A | | 2/1999 | Dunton et al. | |
| 6,786,521 | B1 | | 9/2004 | Jaffke et al. | |

FOREIGN PATENT DOCUMENTS

| DE | 10245486 A1 | 4/2004 |
|---|---|---|
| FR | 2955078 A1 | 7/2011 |

OTHER PUBLICATIONS

International Search Report and Written Opinion dated Feb. 9, 2016 for International Application No. PCT/US2015/056605, International Filing Date Oct. 21, 2015.

* cited by examiner

*Primary Examiner* — Joseph D Pape
(74) *Attorney, Agent, or Firm* — Ralph E. Smith (57) ABSTRACT

A vehicle panel assembly and related method are provided. The vehicle assembly includes a push plug that is movable between a pre-installed position and an installed position where the push plug is aligned with a hole in a vehicle panel. A fastening post extends from the vehicle panel and is received in an aperture in the push plug. An engagement member projects from a side of the fastening post and retains the push plug on the fastening post when the push plug is in the pre-installed position. The aperture is larger than the fastening post in at least one dimension such that the engagement member of the fastening post does not retain the push plug when the push plug is in the installed position. This allows the push plug to fall from the vehicle panel if the push plug is improperly installed in the hole.

20 Claims, 5 Drawing Sheets

PUSH PLUG WITH PASSIVE SEATING FEATURE AND INSTALLATION METHOD

FIELD

The subject application relates to vehicle panel assemblies and methods of installing a push plug in at least one hole of a vehicle panel.

BACKGROUND

This section provides background information related to the present invention, which is not necessarily prior art.

In many different vehicle applications, vehicle panels are utilized to form various parts of a vehicle. Such vehicle panels may include door module carriers, trim pieces, firewalls, sheet metal panels, frame components, dash mats, headliners, tailgate panels, floor panels, insulating mats, and dampening mats. Often such vehicle panels have one or more holes that facilitate installation of the vehicle panel during assembly of the vehicle. For example, such holes may receive fasteners that attach the vehicle panel to a vehicle component or may provide tool access to otherwise obstructed locations. In some instances, these holes are left open in areas of the vehicle that are hidden from view or are designed to be left open to the outside environment. However, many times it is desirable to fill these holes after installation of the vehicle panel to improve the overall appearance of the vehicle or to prevent the incursion of air, dust, water, and noise through the hole.

One solution for filling holes in vehicle panels is to install a push plug in each hole during the assembly process. Some vehicles have hundreds of push plugs serving this purpose. To facilitate the assembly process and to ensure that the push plugs are not lost, the push plugs may be provided with a tether that permanently attaches the push plugs to the vehicle panel at locations adjacent the holes. Once the vehicle panel has been installed and the hole is no longer need, an assembly line operator grabs a push plug, aligns the push plug with the hole, and presses the push plug into the hole. A common problem in such an assembly process is that the push plugs are improperly installed on occasion where the push plug is not fully seated in the hole. At some point during the assembly process, the improperly installed push plug becomes dislodged from the hole allowing the incursion of air, dust, water, and noise through the hole.

An assembled vehicle with an improperly installed push plug is difficult to identify because the tether retains the improperly push plug on the vehicle panel even though it is no longer engaged in the hole. Current methods for identifying such quality problems include water tests that involve submersing an assembled vehicle or a portion thereof in a water bath. The vehicle is then inspected for leaks. Such testing is time intensive and expensive so only a few vehicles in every assembly run are subjected to water tests. The frequency of such tests makes it difficult to identify intermittent quality problems such as improperly installed push plugs. Additionally, when water testing does reveal an improperly installed push plug, much of the vehicle has to be disassembled to find the root cause of the leak and to re-install the push plug. What is needed is a way to reliably identify improperly installed push plugs early on in the assembly process.

SUMMARY

This section provides a general summary of the present invention, and is not a comprehensive disclosure of its full scope or all of its features.

In accordance with one aspect of the present invention, a vehicle panel assembly is provided that includes a vehicle panel having at least one hole and a push plug for installation in the at least one hole. The push plug is movable between a pre-installed position where the push plug is offset from the at least one hole and an installed position where the push plug is aligned with the at least one hole. The vehicle panel assembly further includes a fastening post extending outwardly from the vehicle panel that has a geometric cross-section. The push plug includes a plug tab that defines an aperture. The aperture extends through the plug tab and receives the fastening post. The fastening post has an engagement member projecting from at least one side of the fastening post. The engagement member of the fastening post engages the plug tab and retains the push plug in a fixed orientation on the fastening post when the push plug is in the pre-installed position. The aperture is larger than the geometric cross-section of the fastening post in at least one dimension such that the engagement member of the fastening post does not engage the plug tab and does not retain the push plug on the fastening post when the push plug is in the installed position. Advantageously, this allows the push plug to fall from the vehicle panel in response to improper installation of the push plug in the at least one hole.

In accordance with another aspect of the present invention, a method is provided for installing a push plug in at least one hole of a vehicle panel. The method comprises several steps including providing a fastening post on the vehicle panel that extends outwardly from the vehicle panel, retaining the push plug on the fastening post in a pre-installed position where the push plug is oriented on the fastening post so that the push plug is held offset from the at least one hole in the vehicle panel, and attaching the vehicle panel to a vehicle component. The method also includes the steps of rotating the push plug on the fastening post to an installed position to release the push plug from the fastening post and align the push plug with the at least one hole, inserting a depressed area of the push plug into the at least one hole to install the push plug and seal the at least one hole, and moving the vehicle panel and the vehicle component on an assembly line. The method further includes the step of observing whether the push plug falls from the vehicle panel in response to vibration imparted on the push plug by moving the vehicle panel and the vehicle component on the assembly line.

Thus, it should be appreciated that the vehicle panel assembly and the method discussed herein provide several benefits. The push plug is retained on the vehicle panel in a pre-installed position so that installation of the push plug is facilitated and errant push plugs are not lost. At the same time, the structure of the push plug and the fastening post release the push plug from the vehicle panel in the installed position such that improperly installed push plugs will fall from the vehicle panel. This provides a passive indicator to assembly line operators that the push plug was improperly installed and needs to be re-inserted into the at least one hole of the vehicle panel. This passive indicator functions equally well for all vehicle panel assemblies and not just the select few that are subject to further quality testing. Accordingly, quality improvements may be realized. Additionally, improperly installed push plugs are identified earlier in the assembly process so improperly installed push plugs can be more easily reinstalled without as much vehicle disassembly. This results in substantial cost savings. Another benefit that is realized is that the push plug is fixed in place in the pre-installed position making it less vulnerable to becoming tangled or detached from the vehicle panel before installation. The push plug is also more easily installed because the structure of the push plug and the fastening post provides a locating feature that helps align the push plug with the at least one hole. Finally, the plug tab doubles as a pull tab that can aid in the removal of the push plug from the at least one hole for service or repair. This convenience related benefit is achieved because the plug tab is released from the fastening post in the installed position and is thus free to grab and pull.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, a vehicle panel assembly 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
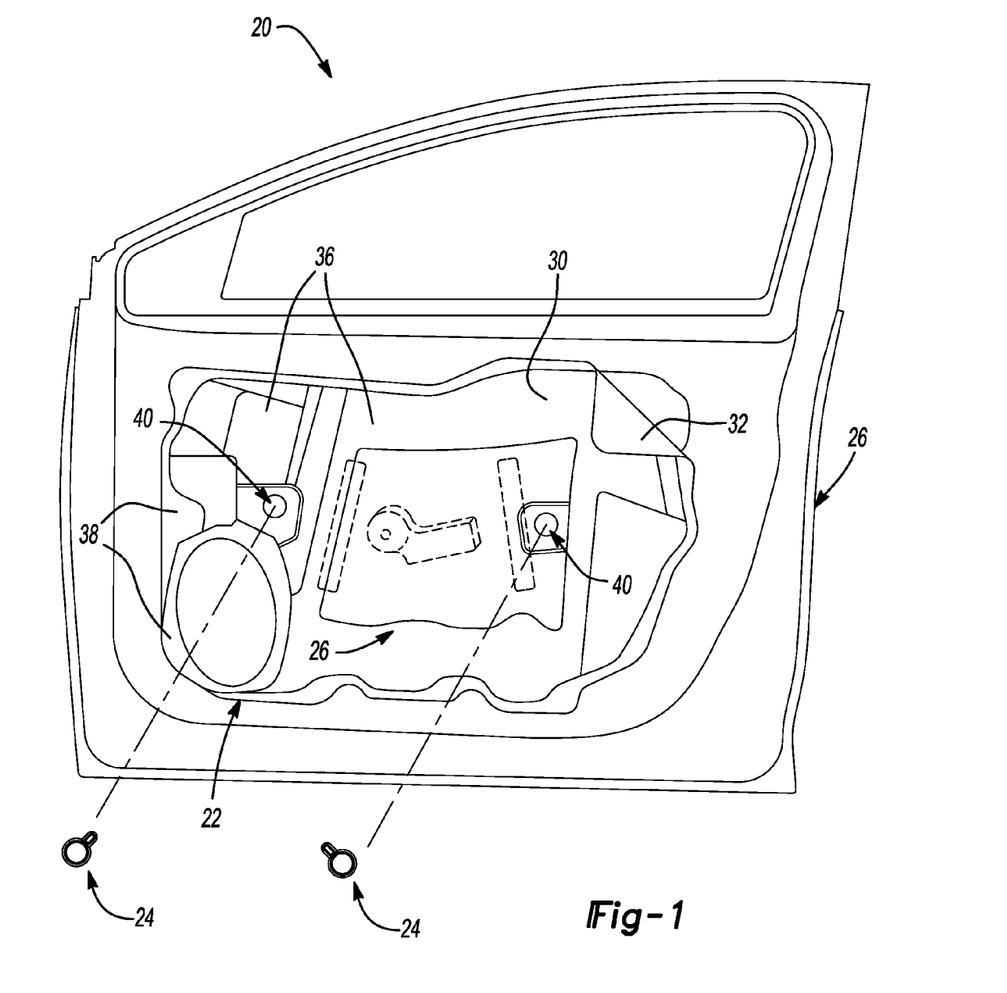
FIG. 1 is a front exploded view of an exemplary vehicle panel assembly constructed in accordance with the subject invention that is shown installed on an exemplary vehicle door.

Referring to FIG. 1, a vehicle panel assembly 20 is illustrated. It should be appreciated that the vehicle panel assembly 20 is part of a larger overall assembly of parts that forms a vehicle. For example and without limitation, the vehicle panel assembly 20 may be part of an automobile or truck. The vehicle panel assembly 20 includes a vehicle panel 22 and one or more push plugs 24. The vehicle panel 22 is generally sheet-like and is attached to a vehicle component 26. In FIG. 1, the vehicle component 26 shown is a vehicle door and the vehicle panel 22 is a door module carrier. Such door module carriers are pre-assembled with a window regulator assembly 28, which may include a regulator motor, a drive mechanism, a regulator cable, one or more regulator tracks, one or more regulator carriages, window glass, and wiring. The door module carrier facilitates assembly line installation of multiple parts in the vehicle door in a faster and more simplified operation. However, it should be appreciated that the scope of the subject application is not limited to door module carriers. It is envisioned that the teachings discussed herein may be applied to a wide variety of vehicle panels 22 located in various areas of the overall vehicle. By way of example and without limitation, the vehicle panel 22 may be one of the various trim pieces, firewalls, sheet metal panels, frame components, dash mats, headliners, tailgate panels, floor panels, insulating mats, and dampening mats that are found in vehicles.

The vehicle panel 22 has an anterior surface 30 and a posterior surface 32 opposite the anterior surface 30. The posterior surface 32 of the vehicle panel 22 faces the vehicle component 26 to which the vehicle panel 22 is attached. In FIG. 1, the posterior surface 32 of the vehicle panel 22 faces the vehicle component 26 (e.g. the vehicle door) and the anterior surface 30 of the vehicle panel 22 faces the interior of the vehicle when the vehicle door is closed. The vehicle panel 22 has a thickness 34 that is defined between the anterior surface 30 and the posterior surface 32. Notwithstanding, the vehicle panel 22 may have a variable thickness. The vehicle panel 22 may or may not be flat. For example, in FIG. 1, the vehicle panel 22 includes a variety of flat sections 36 and molded features 38. The vehicle panel 22 may be made from a wide variety of different materials using various manufacturing processes. By way of example and without limitation, the vehicle panel 22 may be made of a glass filed polypropylene material that may be formed into the shape of the vehicle panel 22 using a molding process.

The vehicle panel 22 has at least one hole 40 that extends entirely through the vehicle panel 22 from the anterior surface 30 to the posterior surface 32. The at least one hole 40 may come in a variety of different shapes and sizes. In FIG. 1, two such holes 40 are shown that are round and that have equal hole diameters 42. The at least one hole 40 may be formed in a variety of ways, including, for example, during the molding process or by drilling, stamping, or cutting. The at least one hole 40 may be included in the vehicle panel 22 for a variety of reasons. For example, in FIG. 1, the two holes 40 are provided in the vehicle panel 22 to permit installation of the vehicle panel assembly 20 on the vehicle component 26 (e.g. the vehicle door). The holes 40 provide access to fasteners (not shown) used to attach the vehicle panel assembly 20 to the vehicle component 26 (e.g. the vehicle door). Once the vehicle panel assembly 20 is installed, the at least one hole 40 may not serve a useful purpose unless disassembly is later required, such as for service or repair. The at least one hole 40 provides a path through which air, dust, water, and noise can travel through the vehicle panel 22. Such intrusion may be undesirable and the at least one hole 40 may need to be sealed after the vehicle panel assembly 20 is attached to the vehicle component 26.

Figure 2:
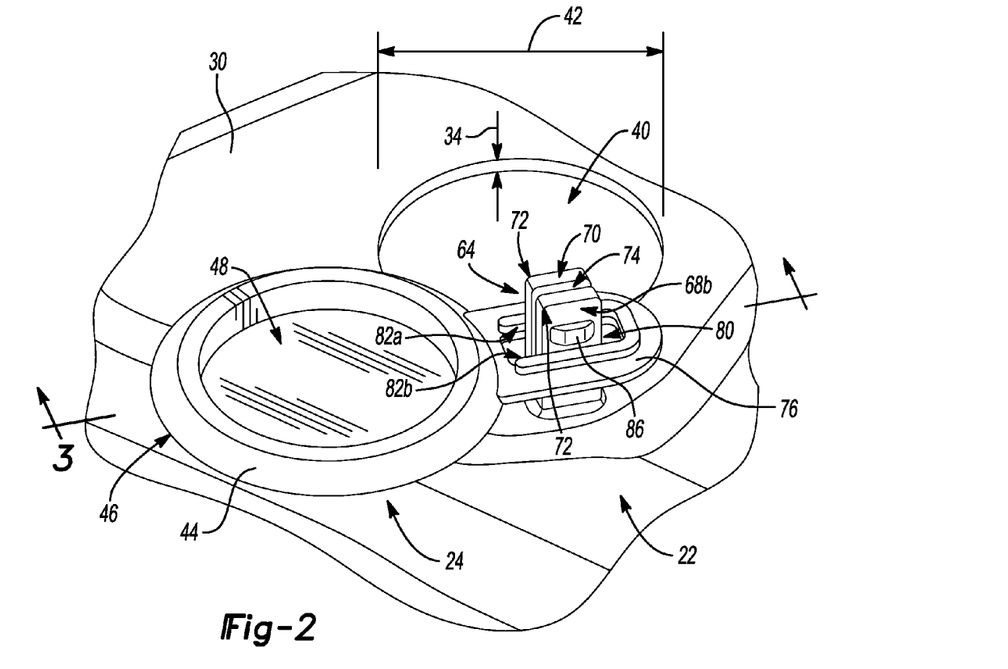
FIG. 2 is an enlarged front perspective view of the exemplary push plug and fastening post of the vehicle panel assembly illustrated in FIG. 1.

The push plug 24 of the vehicle panel assembly 20 is illustrated in FIG. 2. The size and shape of the push plug 24 is selected so that the push plug 24 may be installed in the at least one hole 40 of the vehicle panel 22. The push plug 24 generally includes a flange 44 defining a perimeter 46 of the push plug 24 and a depressed area 48 disposed inward of the flange 44. The perimeter 46 of the push plug 24 is disposed within and defines a medial plane 50. Although the perimeter 46 of the push plug 24 illustrated in the Figures is circular, it should be appreciated that the push plug 24 shown is merely exemplary and that the push plug 24 may alternatively have a non-circular shape and perimeter 46.

Figure 3:
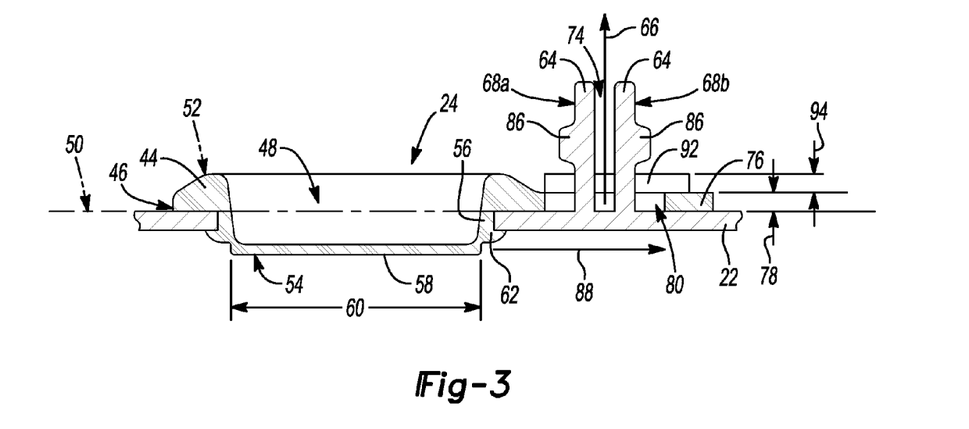
FIG. 3 is a side cross-sectional view taken along line 3-3 of the exemplary push plug and fastening post of the vehicle panel assembly illustrated in FIG. 1.

As best seen in FIG. 3, the push plug 24 has an anterior face 52 and a posterior face 54 opposite the anterior face 52. The posterior face 54 of the push plug 24 faces the anterior surface 30 of the vehicle panel 22. More particularly, portions of the posterior face 54 of the push plug 24 abut portions of the anterior surface 30 of the vehicle panel 22 adjacent the at least one hole 40 when the push plug 24 is installed in the at least one hole 40. Advantageously, this abutting relationship seals the at least one hole 40 and prevents unwanted incursion of air, dust, water, and noise. The depressed area 48 of the push plug 24 protrudes from the posterior face 54 of the push plug 24 and extends past the medial plane 50. The depressed area 48 is formed by a side wall 56 that extends from the flange 44 and a bottom wall 58 that is transverse to the side wall 56. While other arrangements are possible, the bottom wall 58 of the push plug 24 shown in the Figures has a flat circular shape and is substantially parallel to, and spaced from, the medial plane 50. As such, the bottom wall 58 spans an area encircled by the side wall 56 and closes off the depressed area 48 such that air, dust, water, and noise cannot flow through the depressed area 48 of the push plug 24. The bottom wall 58 of the depressed area 48 has a base diameter 60 that is smaller than the hole diameter 42 such that the depressed area 48 is received in the at least one hole 40. The flange 44 seals against the anterior surface 30 of the vehicle panel 22 when the push plug 24 is installed in the at least one hole 40 such that any air, dust, water, and noise attempting to flank the depressed area 48 by traveling along the side wall 56 is stopped by the flange 44.

Referring to FIGS. 2 and 3, the flange 44 has a frustoconical shape that slopes from the side wall 56 of the depressed area 48 to the perimeter 46 of the push plug 24. The posterior face 54 of the push plug 24 may further include a ramped member 62 that extends annularly about the side wall 56 of the depressed area 48 adjacent the bottom wall 58. The ramped member 62 engages the posterior surface 32 of the vehicle panel 22 when the push plug 24 is installed in the at least one hole 40. The ramped member 62 thus helps retain the push plug 24 in the at least one hole 40 and increases positive engagement. In some embodiments, the ramped member 62 may be eliminated without departing from the scope of the subject application. Generally, the structure of the push plug 24 defines a maximum insertion force required to properly seat the depressed area 48 into the at least one hole 40. The maximum insertion force may vary depending upon a several variables, including without limitation, whether the ramped member 62 is present, design tolerances, materials chosen, the geometry of the push plug 24 and the at least one hole 40, and application based needs. In one embodiment, the maximum insertion force of the push plug 24 is less than or equal to 44.5 Newton (N); however, the push plug 24 of the present application is not necessarily limited to this maximum insertion force.

Figure 4:
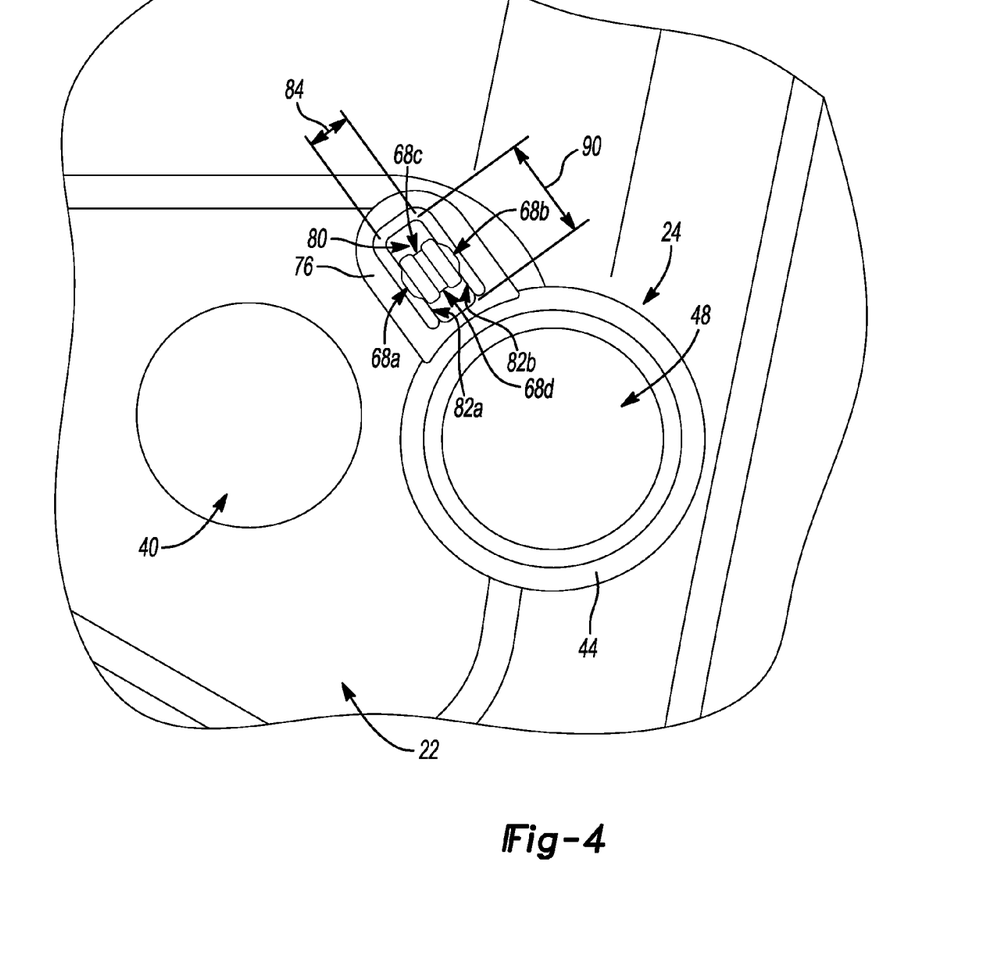
FIG. 4 is a partial front elevation view of the exemplary push plug and fastening post of the vehicle panel assembly illustrated in FIG. 1 where the push plug is shown in the pre-installed position.
Figure 5:
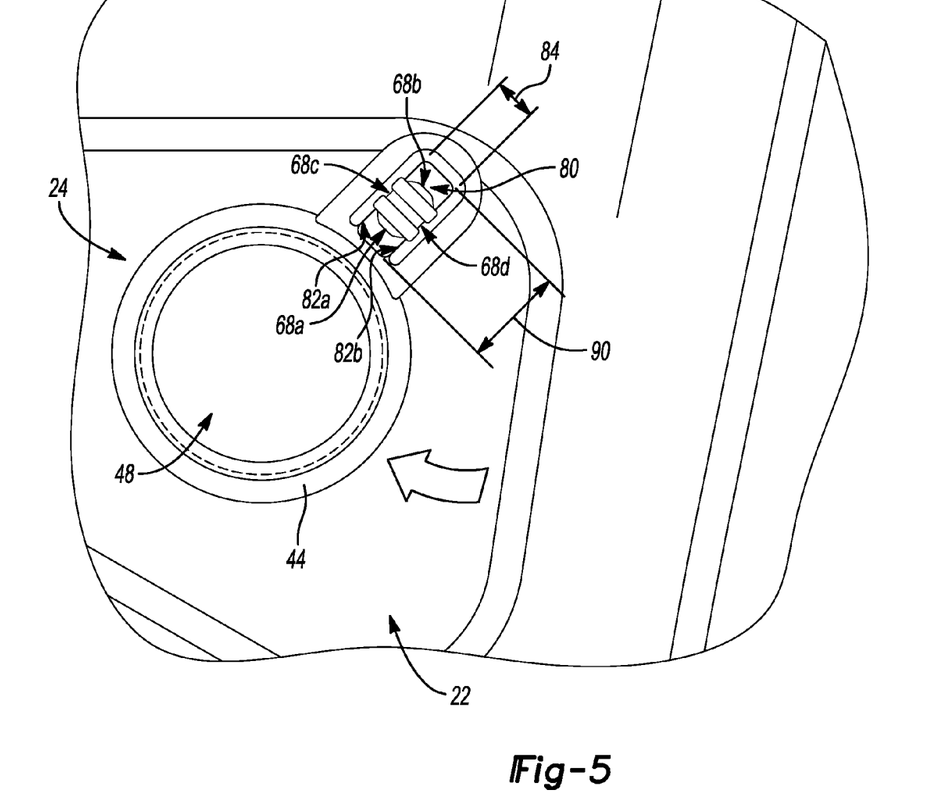
FIG. 5 is another partial front elevation view of the exemplary push plug and fastening post of the vehicle panel assembly illustrated in FIG. 1 where the push plug is shown in the installed position.

Referring generally to FIGS. 2-5, the vehicle panel 22 includes a fastening post 64 that extends outwardly from the anterior surface 30 of the vehicle panel 22 along a first axis 66. The first axis 66 of the fastening post 64 is transverse with respect to the anterior surface 30 of the vehicle panel 22 in an area adjacent the fastening post 64. The first axis 66 of the fastening post 64 is also transverse to the medial plane 50 of the push plug 24, which may be substantially parallel to the anterior surface 30 of the vehicle panel 22 in the area adjacent the fastening post 64. Notwithstanding, other orientations are possible and are considered to be within the scope of the subject application. The fastening post 64 may be disposed adjacent to, but spaced from, the at least one hole 40. The fastening post 64 includes at least one side 68. As best seen in FIGS. 4 and 5, the fastening post 64 has a geometric cross-section 70 with at least four flat sides 68a, 68b, 68c, 68d including a first pair of opposing sides 68a, 68b and a second pair of opposing sides 68c, 68d. The geometric cross-section 70 of the fastening post 64 may or may not include rounded corners 72 disposed between each of the four flat sides 68a, 68b, 68c, 68d. Further, various geometric cross-sections 70 are possible that may have additional sides or fewer sides than four. For example and without limitation, the geometric cross-section 70 of the fastening post 64 may be triangular, circular, tear-drop shaped, oval shaped, or polygonal. In the embodiment shown, the fastening post 64 is molded integrally with the vehicle panel 22 and has a slot 74 extending across the geometric cross-section 70 between the second pair of opposing sides 68c, 68d. This slot 74 is provided such that the fastening post 64 will not become mold locked during the molding process of the vehicle panel 22. Accordingly, the slot 74 may be eliminated with affecting the operation of the fastening post 64.

As shown in FIGS. 2, 4, and 5, the fastening post 64 is oriented on the vehicle panel 22 such that one side 68a of the first pair of opposing sides 68a, 68b faces the at least one hole 40. The push plug 24 includes a plug tab 76 that is releasably retained on the fastening post 64. Although other orientations of the plug tab 76 may be possible, the plug tab 76 shown in the Figures extends outwardly from the perimeter 46 of the flange 44 of the push plug 24 along the medial plane 50. The plug tab 76 has a pre-determined thickness 78 that may be measured between the anterior face 52 and the posterior face 54 of the push plug 24 at the plug tab 76. The plug tab 76 also defines an aperture 80 extending entirely through the plug tab 76 that receives the fastening post 64. Thus, the push plug 24 may be rotated about the first axis 66 of the fastening post 64 between a pre-installed position and an installed position. FIG. 4 shows the push plug 24 in the pre-installed position where the push plug 24 is offset from the at least one hole 40. In other words, the depressed area 48 of push plug 24 is positioned over (i.e. overlaps) the vehicle panel 22 when the push plug 24 is placed in the pre-installed position. FIG. 5 shows the push plug 24 in the installed position where the push plug 24 is aligned with the at least one hole 40. In other words, the depressed area 48 of the push plug 24 is positioned over (i.e. is aligned with) the at least one hole 40 in the vehicle panel 22 when the push plug 24 is rotated to the installed position. The aperture 80 in the plug tab 76 presents at least two opposing engagement sides 82a, 82b. The geometric relationship of the four sides 68a, 68b, 68c, 68d of the fastening post 64 and the at least two opposing engagement sides 82a, 82b of the aperture 80 relative to the at least one hole 40 in the vehicle panel 22 and the depressed area 48 of the push plug 24 locate the push plug 24 in the pre-installed position and the installed position. Specifically, the at least two opposing engagement sides 82a, 82b of the aperture 80 abut the first pair of opposing sides 68a, 68b of the fastening post 64 to define the pre-installed position and the at least two opposing engagement sides 82a, 82b of the aperture 80 abut the second pair of opposing sides 68c, 68d of the fastening post 64 to define the installed position. Although the at least two opposing engagement sides 82a, 82b of the aperture 80 may have a variety of different shapes and configurations, the at least two opposing engagement sides 82a, 82b shown in the drawings are flat and are spaced from one another to define a gap distance 84 between the at least two opposing engagement sides 82a, 82b.

In the embodiment shown in the Figures, an engagement member 86 is disposed on and projects from each side of the first pair of opposing sides 68a, 68b of the fastening post 64. Thus, the engagement member 86 illustrated is a pair of engagement members 86. Notwithstanding, the fastening post 64 may alternatively be provided with a single engagement member 86 projecting outwardly from any one of the one or more sides 68a, 68b, 68c, 68d of the fastening post 64. The engagement member 86 engages the plug tab 76 and retains the push plug 24 in a fixed orientation on the fastening post 64 when the push plug 24 is in the pre-installed position. Advantageously, the geometric cross-section 70 of the fastening post 64 and the at least two opposing engagement sides 82a, 82b of the aperture 80 cooperate with the one another and the engagement member 86 to prevent the push plug 24 from freely swinging around relative to the fastening post 64, and thus the vehicle panel 22, during shipping and handling of the vehicle panel assembly 20. As a result, instances of tangled, torn, or missing push plugs 24 are reduced prior to installation of the vehicle panel assembly 20 on the vehicle component 26.

The aperture 80 in the plug tab 76 is larger than the geometric cross-section 70 of the fastening post 64 in at least one dimension 88. By way of example and without limitation, the aperture 80 shown in FIGS. 2, 4, and 5 is oblong and extends along the plug tab 76 a pre-determined length 90 that exceeds the gap distance 84 between the at least two opposing engagement sides 82a, 82b. In other words, the aperture 80 shown in the drawings is generally rectangular where the pre-determined length 90 of the aperture 80 is greater than the gap distance 84 between the at least two opposing engagement sides 82a, 82b (i.e. a width of the aperture 80). Thus, the aperture 80 is larger than the geometric cross-section 70 of the fastening post 64 along the pre-determined length 90, which is the at least one dimension 88 in this example. As a result of this geometry of the aperture 80, the engagement member 86 of the fastening post 64 does not engage the plug tab 76 and does not retain the push plug 24 on the fastening post 64 when the push plug 24 is in the installed position. Advantageously, this allows the push plug 24 to fall from the vehicle panel 22 when the push plug 24 is improperly installed (i.e. not completely seated) in the at least one hole 40 in the vehicle panel 22. The applicants have found that the vibration and movement imparted on the vehicle panel assembly 20 and the vehicle component 26 as the same move along an assembly line is sufficient to dislodge the push plug 24 from the at least one hole 40 in the vehicle panel 22. Because the engagement member 86 does not retain the plug tab 76 on the fastening post 64 in the installed position, the improper installation of a push plug 24 can be easily be determined by line operators who will observe the push plug 24 falling from the vehicle panel assembly 20. In other words, the design of the push plug 24 described herein provides a passive visible indication of an improperly installed push plug 24. To this end, the anterior and posterior faces 52, 54 of the push plug 24 can be made to have a highly visible color such that the push plug 24 can easily be seen when the push plug 24 falls from the vehicle panel 22. By way of example and without limitation, the highly visible color may be yellow, orange, red, pink, or bright green.

Another advantage provided by the subject push plug 24 is that the plug tab 76 doubles as a pull tab when the push plug 24 needs to be removed from the at least one hole 40 such as for service or repair. Because the engagement member 86 does not retain the plug tab 76 on the fastening post 64 in the installed position, a service technician can pull on the plug tab 76 to quickly and easily remove the push plug 24 from the at least one hole 40 in the vehicle panel 22. The plug tab 76 may be made of a resilient material such that the at least two opposing engagement sides 82a, 82b deflect when the push plug 24 is rotated and bias the push plug 24 to the pre-installed position and the installed position. By way of example and without limitation, the push plug 24 and plug tab 76 may be integral with one another and may be made of a polyurethane material. The plug tab 76 may also include a collar projection 92 disposed on the anterior face 52 of the push plug 24 adjacent the aperture 80. The collar projection 92 may optionally be U-shaped and has a pre-determined height 94 above the anterior face 52 of the plug tab 76. Although the collar projection 92 may be eliminated in some embodiments, the collar projection 92 stiffens the plug tab 76 adjacent the at least two opposing engagement sides 82a, 82b of the aperture 80 to further improve biasing and the locating function provided by the at least two opposing engagement sides 82a, 82b. When the plug tab 76 has the collar projection 92, the engagement member 86 is spaced from the anterior surface 30 of the vehicle panel 22 by a pre-determined distance that is greater than a sum of the pre-determined thickness 78 of the plug tab 76 and the pre-determined height 94 of the collar projection 92. Accordingly, the engagement member 86 may extend outwardly over the collar projection 92 of the plug tab 76 when the push plug 24 is placed in the pre-installed position.

Figure 6:
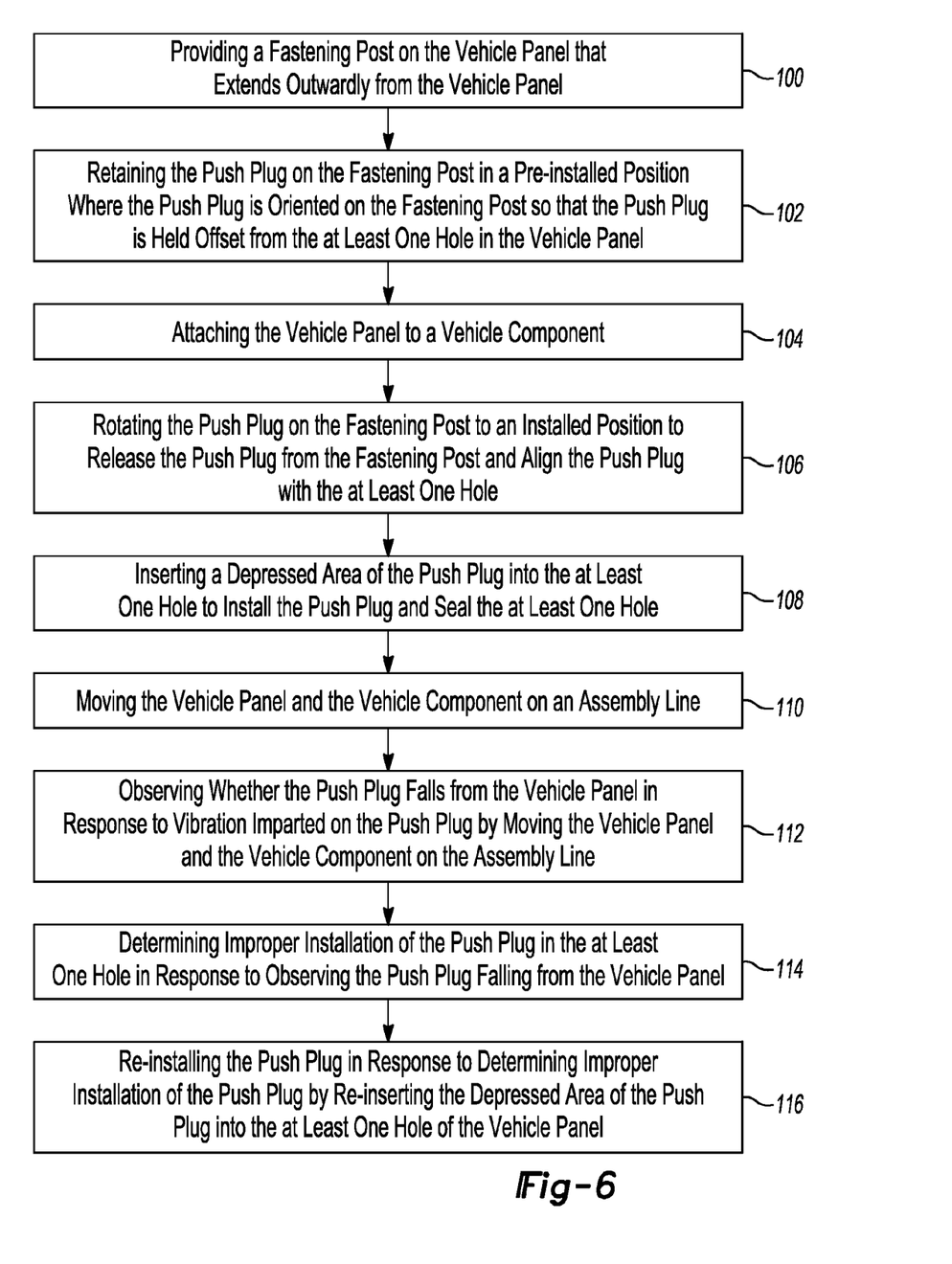
FIG. 6 is a flow diagram illustrating the steps of an exemplary method of installing the push plug described herein in at least one hole in a vehicle panel.

The subject application also provides for a method of installing a push plug 24 in at least one hole 40 of a vehicle panel 22. The steps of the method are discussed below with reference to FIG. 6. The method includes step 100 of providing a fastening post 64 on the vehicle panel 22 that extends outwardly from the vehicle panel 22. Step 102 includes retaining the push plug 24 on the fastening post 64 in a pre-installed position where the push plug 24 is oriented on the fastening post 64 so that the push plug 24 is held offset from the at least one hole 40 in the vehicle panel 22. The method further includes step 104 of attaching the vehicle panel 22 to a vehicle component 26 and step 106 of rotating the push plug 24 on the fastening post 64 to an installed position to release the push plug 24 from the fastening post 64 and align the push plug 24 with the at least one hole 40. The method also includes step 108 of inserting a depressed area 48 of the push plug 24 into the at least one hole 40 to install the push plug 24 and seal the at least one hole 40 and step 110 of moving the vehicle panel 22 and the vehicle component 26 on an assembly line. Step 112 of the method is performed by observing whether the push plug 24 falls from the vehicle panel 22 in response to vibration imparted on the push plug 24 by moving the vehicle panel 22 and the vehicle component 26 on the assembly line in accordance with step 110. Step 114 includes determining improper installation of the push plug 24 in the at least one hole 40 in response to observing the push plug 24 falling from the vehicle panel 22 in accordance with step 112. Step 116 of the method is performed by re-installing the push plug 24 in response to determining improper installation of the push plug 24 in accordance with step 114 by re-inserting the depressed area 48 of the push plug 24 into the at least one hole 40 of the vehicle panel 22. Advantageously, the method provides for the passive identification of improperly installed push plugs 24 without the disadvantages associated with relying on water tests to identify installation problems. It should be appreciated that the steps of the method may be performed in a different order than that listed herein without departing from the scope of the subject application. Additionally, intervening steps that are not listed herein may be performed in addition to these steps without departing from the scope of the subjection application.

Many other modifications and variations of the present invention are possible in light of the above teachings and may be practiced otherwise than as specifically described while within the scope of the appended claims. By way of example and without limitation, the push plug 24 discussed herein may be modified to act as a grommet, where the bottom wall 58 is either eliminated or provided with a through bore (not shown). In accordance with the above teachings, the grommet would fall from the vehicle panel assembly 20 in response to improper installation before the vehicle panel assembly 20 reached a point on the assembly line where a component is inserted through the through bore of the grommet. Thus, the same new result may be realized. These antecedent recitations should be interpreted to cover any combination in which the inventive novelty exercises its utility. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described.

What is claimed is:

1. A vehicle panel assembly comprising:
   a vehicle panel having at least one hole;
   a push plug for installation in said at least one hole that is movable between a pre-installed position where said push plug is offset from said at least one hole and an installed position where said push plug is aligned with said at least one hole;
   a fastening post extending outwardly from said vehicle panel that has a geometric cross-section;
   said push plug including a plug tab defining an aperture that extends through said plug tab and that receives said fastening post;
   said fastening post having an engagement member projecting from at least one side of said fastening post that engages said plug tab and retains said push plug in a fixed orientation on said fastening post when said push plug is in said pre-installed position; and
   said aperture being larger than said geometric cross-section of said fastening post in at least one dimension such that said engagement member does not engage said plug tab and does not retain said push plug on said fastening post when said push plug is in said installed position to allow said push plug to fall from said vehicle panel in response to improper installation of said push plug in said at least one hole.

2. A vehicle panel assembly as set forth in claim 1 wherein said fastening post has at least four flat sides including a first pair of opposing sides and a second pair of opposing sides and said fastening post is oriented on said vehicle panel such that one side of said first pair of opposing sides faces said at least one hole.

3. A vehicle panel assembly as set forth in claim 2 wherein said aperture has at least two opposing engagement sides that abut said first pair of opposing sides of said fastening post to define said pre-installed position and that abut said second pair of opposing sides of said fastening post to define an installed position.

4. A vehicle panel assembly as set forth in claim 3 wherein said plug tab is made of a resilient material such that said at least two opposing engagement sides deflect when said push plug is rotated and bias said push plug to said pre-installed position and said installed position.

5. A vehicle panel assembly as set forth in claim 4 wherein said plug tab includes a collar projection adjacent said aperture that is U-shaped and that has a pre-determined height to stiffen said plug tab adjacent said at least two opposing engagement sides.

6. A vehicle panel assembly as set forth in claim 5 wherein said plug tab has a pre-determined thickness and said engagement member is spaced from said vehicle panel by a pre-determined distance that is greater than a sum of said pre-determined thickness of said plug tab and said pre-determined height of said collar projection.

7. A vehicle panel assembly as set forth in claim 2 wherein said engagement member is a pair of engagement members extending from said first pair of opposing sides of said fastening post respectively.

8. A vehicle panel assembly as set forth in claim 3 wherein said at least two opposing engagement sides are flat and spaced from one another by a gap distance and said aperture is oblong and extends along said plug tab to a pre-determined length that exceeds said gap distance.

9. A vehicle panel assembly as set forth in claim 4 wherein said push plug and said plug tab are integral with one another and are made of a polyurethane material.

10. A vehicle panel assembly as set forth in claim 1 wherein said vehicle panel is a door module carrier.

11. A vehicle panel assembly as set forth in claim 1 wherein said push plug has a highly visible color such that said push plug can easily be seen when said push plug falls from said vehicle panel in response to improper installation of said push plug in said at least one hole.

12. A vehicle panel assembly as set forth in claim 1 wherein said fastening post is molded integrally with said vehicle panel and is disposed adjacent to and spaced from said at least one hole.

13. A vehicle panel assembly as set forth in claim 1 wherein said push plug has a flange and a depressed area disposed inward of said flange, said flange defining a perimeter of said push plug that is disposed within a medial plane, said depressed area extending from said flange past said medial plane.

14. A vehicle panel assembly as set forth in claim 13 wherein said depressed area of said push plug includes a side wall extending from said flange and a bottom wall that is transverse to said side wall, said bottom wall having a flat circular shape that is parallel to and spaced from said medial plane and said bottom wall having a base diameter that is smaller than a diameter of said at least one hole such that said depressed area is received in said at least one hole and said flange seals against said vehicle panel when said push plug is installed in said at least one hole.

15. A vehicle panel assembly as set forth in claim 14 wherein said flange has a frustoconical shape that slopes from said side wall of said depressed area to said perimeter of said push plug.

16. A vehicle panel assembly as set forth in claim 15 wherein said push plug has a ramped member extending from said side wall of said depressed area adjacent said bottom wall that engages said vehicle panel when said push plug is installed in said at least one hole.

17. A vehicle panel assembly as set forth in claim 13 wherein said plug tab extends from said perimeter of said flange along said medial plane and is releasably retained on said fastening post.

18. A method of installing a push plug in at least one hole of a vehicle panel comprising the steps of:
providing a fastening post on the vehicle panel that extends outwardly from the vehicle panel;
retaining the push plug on the fastening post in a pre-installed position where the push plug is oriented on the fastening post so that the push plug is held offset from the at least one hole in the vehicle panel;
attaching the vehicle panel to a vehicle component;
rotating the push plug on the fastening post to an installed position to release the push plug from the fastening post and align the push plug with the at least one hole;
inserting a depressed area of the push plug into the at least one hole to install the push plug and seal the at least one hole;
moving the vehicle panel and the vehicle component on an assembly line; and
observing whether the push plug falls from the vehicle panel in response to vibration imparted on the push plug by moving the vehicle panel and the vehicle component on the assembly line.

19. A method as set forth in claim 18 further comprising the step of:
determining improper installation of the push plug in the at least one hole in response to observing the push plug falling from the vehicle panel.

20. A method as set forth in claim 19 further comprising the step of:
re-installing the push plug in response to determining improper installation of the push plug by re-inserting the depressed area of the push plug into the at least one hole of the vehicle panel.

* * * * *